Patented Dec. 29, 1942

2,306,371

UNITED STATES PATENT OFFICE 2,306,371

COMPOSITION

Thomas F. Banigan, Kenmore, N. Y., assignor to E. I. du Pont de Nemours & Company, Wilmington, Del., a corporation of Delaware No Drawing. Application January 17, 1941, Serial No. 374,863

12 Claims. (Cl. 106—287)

This invention relates to conserving pellicles in the wet state, especially to preventing bacteria, mold and the like from impairing gel cellulosic structures. More particularly, it appertains to aqueous storage solutions which maintain shrinkable regenerated cellulose caps and bands in normal condition.

Because shrinkable, non-fibrous secondary closures such as thimble-shaped caps and tube-shaped bands provide an effective spot for printed matter (advertising, directions, etc.) and an ornamental deterrent against tampering with the contents, they are used extensively on bottles and the like.

To seal a bottle, the cap or band in gel condition form is slipped over the container top (the primary closure being in place) and allowed to dry. The shrinkage which accompanies the drying of (loss of water from) gel structures of regenerated cellulose and the like causes the dry structure to form a tightly stretched seal fitting the bottle neck and primary closure with extremely firm engagement.

The beauty and attractiveness of the bands can be enhanced by dyeing and pigmentation. Decoration of the bands (particularly the pigmented ones) by printing, is common practice. Typical procedures are described in U. S. A. Patents No. 2,141,744 (Evans) and 1,997,767 (Fletcher).

After manufacture, it is customary to pack the bands in liquid-tight containers, together with sufficient aqueous solution to maintain them in gel condition until ready for use. Details of packaging for storage and shipment are disclosed in U. S. A. Patent No. 2,164,505 (Edwards). The purchaser has only to remove the bands from the shipping solution and apply them to the bottles. The solution usually contains a softening material such as glycerol, which remains in the band and prevents it from becoming brittle when dry.

The gel regenerated cellulose structures and the glycerol softener are very susceptible to attack by mold and bacteria.

No difficulty has been experienced in finding substances which preclude the action of mold and bacteria, but up to the present time the problem has not been satisfactorily solved, because certain other controlling factors are involved. Formaldehyde, for example, has a very satisfactory preserving action but it reacts in some manner with the gel cellulose and in a short time is substantially removed from the solution. In addition, it causes skin irritation (dermatitis) on the hands of the workers who apply the bands. Positioning the bands (on the bottle tops) is a hand operation. Workers have their hands wet with the shipping solution for hours at a time. Any material toxic or irritating to the skin cannot be used in such solutions.

Another aspect in which heretofore suggested preservatives are undesirable is the effect on the appearance of the bands. To be completely satisfactory, the preservative must be colorless, odorless (or have an agreeable odor), must not cause the ink (in the printing on the band), dye, and/or pigment (in the band) to bleed or be bleached, and must prevent discoloration due to the formation of colored bodies (for example, iron hydroxide) by contamination with materials of the shipping container.

The cost of the preservative is also important, and from an economic standpoint it is desirable that the preserving action be strong so that small quantities of the preservative can be used in order to keep down the cost.

The principal object of this invention was to provide a preservative solution for gel regenerated cellulose bands which was stable, efficient, non-irritating, colorless, and would not cause dermatitis. Further objects were to provide preservatives for gel pellicle softening solutions which would have an agreeable odor and in addition protect both the pellicle and the softener from attack by mold and bacteria, to provide a preservative for gel regenerated cellulose which is compatible with, and soluble in, without discoloring, water-glycerol solutions, and to provide a preservative for wet gel regenerated cellulose pellicles packed in a solution of water and glycerol, and which is neither toxic nor irritating to human skin. Still further objects were to provide preservative materials which would retard the fading of developed colors in dyes and inks on gel regenerated cellulosic material, and to provide preservatives which would protect gel band storage solutions from discoloration when in contact with iron (the commonly used container material). A general advance in the art, and other objects which will appear hereinafter, are also contemplated.

It has now been found that phenyl biguanide, having the formula:

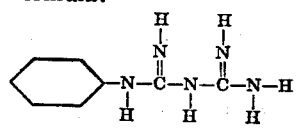

satisfies the requirements previously mentioned.

From the following description and specific examples, in which are disclosed certain embodiments of the invention as well as details of what is believed to be the best mode for carrying out the invention, it will be apparent how the foregoing objects and related ends are accomplished. Parts are given by weight throughout the specification unless otherwise specified.

*Example I*

Continuous gel regenerated cellulose tubing, which had been produced, desulfured, bleached and washed in the usual manner (U. S. A. Patents Nos. 1,548,864 and 2,141,776), is impregnated with an aqueous solution comprising glycerol 8% and phenyl biguanide 0.25%, by passage through a vat containing the same. The tubing is then cut into suitable lengths for application to bottle neck tops (U. S. A. Patent No. 1,647,489). Some of the resulting bands, after draining excess solution therefrom, are immediately applied to bottles, and others are stored in more of the impregnating solution.

The pellicles when dried upon the bottles will be found to contain approximately 24% glycerol and 0.75% phenyl biguanide. No bacterial or fungicidal action develop in these bands.

The stored bands may be tested for mold growth and bactericidal decomposition after periods ranging from four months to over one year, and no deleterious development will be found.

*Example II*

Continuous gel regenerated cellulose tubing, produced in the conventional manner, is impregnated with an aqueous solution comprising glycerol 8%, ortho-tolyl biguanide 0.25%. The tubing is then printed with azo dyes (U. S. A. Patent No. 1,997,767) and cut into bands of conventional dimensions. After storage for several months no detrimental bactericidal or fungicidal action will be found to develop, and the printing is more stable to change induced by exposure to light than bands similarly prepared and colored but stored in a similar solution omitting the ortho-tolyl biguanide.

Some of these bands may be stored in a solution containing, in addition to the ortho-tolyl biguanide and glycerol, 0.25% sodium nitrite. When these bands are removed from the storage solution and dried in contact with iron, no discoloration is formed in the cellulosic pellicle. Discoloration also fails to develop in bands stored in the sodium nitrite containing solutions in which the storage containers are constructed of iron. Furthermore, no discoloration develops when the bands are applied to bottles having metal primary closures.

*Example III*

The procedures of Example II are repeated, using impregnating and storage solutions consisting of:

| | Percent |
|---|---|
| Glycerol | 8 |
| Phenyl biguanide | 0.25 |
| Disodium phosphate dodecahydrate | 1.31 |
| Water | Remainder |

Similar results are obtained when the bands are tested.

*Example IV*

The procedures of Example I are repeated, using an aqueous solution comprising:

| | Percent |
|---|---|
| Glycerol | 8 |
| Ortho-tolyl biguanide | 0.25 |
| Disodium phosphate dodecahydrate | 1.31 |

The results obtained are similar to those described in Examples I and II.

*Example V*

Gel regenerated cellulose bands are prepared as previously described, and impregnated with and stored in a solution comprising essentially water and glycerol 4%, triethanolamine 4% and phenyl biguanide 0.25%. In addition to the advantages observed in Examples I and II, these bands do not discolor or become yellowed after one week of exposure to direct sunlight, as is usually the case with bands softened with triethanolamine in the absence of the biguanide.

*Example VI*

Example V is repeated, replacing the phenyl biguanide with an equal weight of ortho-tolyl biguanide. Similar results are obtained.

*Example VII*

Gel regenerated cellulose pellicles, prepared according to Example I, are impregnated by storage in an aqueous solution comprising glycerol 8% and phenyl biguanide 0.2%. These bands may be applied to bottles as secondary closures and allowed to dry in the usual manner. The results are similar to those described in Example I.

*Example VIII*

Example VII is repeated, substituting ortho-tolyl biguanide for phenyl biguanide. The results are the same.

*Example IX*

Continuous gel regenerated cellulose tubing is prepared in the previously described manner, impregnated with an aqueous solution containing 0.1% phenyl biguanide, rolled into large coils, and stored in some of the impregnating solution for several weeks. The tubing is then removed and decorated by impregnating it with the anilide of beta-hydroxy naphthoic acid, followed by printing with diazotized dianisidine (see U. S. A. Patent No. 1,997,767). A dark blue design results. No deleterious mold growth or bactericidal development occurs during storage or drying of these bands.

*Example X*

Example IX is repeated, substituting ortho-tolyl biguanide for the phenyl biguanide. Similar results are obtained.

*Example XI*

Example IX is repeated, using 1.0% phenyl biguanide in the impregnating and storage solution. Excellent results are obtained even after several months's storage of the tubing.

*Example XII*

Example XI is repeated, substituting ortho-tolyl biguanide for the phenyl biguanide. Similar results are obtained.

*Example XIII*

Example IX is repeated, using an impregnating and storage solution comprising glycerol 8%, phenyl biguanide 0.25%, and water. In the decoration of this tubing the ortho-phenetidide of beta-hydroxy naphthoic acid is used for impregnation, and diazotized paranitroaniline is used for the coupling component. The figures produced are dark red.

*Example XIV*

Example XIII is repeated, using an equal amount of ortho-tolyl biguanidine in place of phenyl biguanide. Similar results are obtained.

*Example XV*

Gel regenerated cellulose bands are prepared in the manner described in Example II, brought to an equilibrium in a solution consisting of glycerol 35%, ortho-tolyl biguanide 1.05%, and the remainder water. Excess liquid is drained from the bands, and they are dried by exposure to air while piled loosely. They may then be stored for several weeks, and thereafter shipped free from liquid. The shipped bands are wet with sufficient water to provide a solution comprising glycerol 6% and ortho-tolyl biguanide 0.15%. The rewetting operation causes swelling of the bands. The swelled bands are applied to bottle necks and allowed to shrink by drying thereon in the conventional manner. No bactericidal or fungicidal action is detectable at any time during this procedure.

*Example XVI*

Example XV is repeated, replacing the ortho-tolyl biguanide with an equivalent amount of phenyl biguanide. Similar results are obtained.

Preferably a shipping (or impregnating) solution, which when put into contact with the wet cellulosic material will come to an equilibrium at 8% glycerol, 0.25% phenyl (used broadly) biguanide and 91.75% water, is employed. Larger or smaller quantities of the preservative may be employed. The preferred range is 0.1% to 1.0%. The amount utilized will depend upon the result desired, and this amount can readily be determined empirically. The dried pellicle should contain at least 0.3%, and preferably 0.3% to 3.0%, of the biguanide derivative, in order to give adequate protection over long periods of time.

The phenyl biguanide may have substituents on the benzene ring and still be within the scope of the present invention, as evidenced by the methyl radical which has replaced a ring hydrogen in the ortho-tolyl biguanide (of Example II) having the formula:

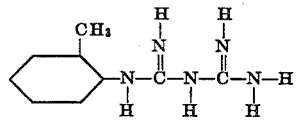

The ortho-tolyl biguanide crystallizes at room temperature with half a molecule of water of crystallization. Other phenyl (used broadly) biguanides and their mode of preparation are disclosed in U. S. A. Patent No. 2,255,090 (Tinker & Kvalnes).

Minor variations in results (bactericidal, fungicidal, toxicity, rust prevention, dye stabilization, etc.) depend upon the number and kind of substituents present. Mixtures of phenyl biguanides may be used.

Softeners other than glycerol and triethanolamine may be employed. These are well known in the prior art, see for example, U. S. A. Patents No. 2,074,349 (Underwood), 2,142,116 (Cupery), 2,199,927 (Underwood), 2,215,974 (Peters) and 2,221,383 (Peters), and in the interest of brevity need not be mentioned here.

For convenience, the description of the invention has been based on regenerated cellulose. Related materials, such as low substituted cellulose ethers (U. S. A. Patent No. 2,123,883) and the like, which are precipitated from aqueous (or aqueous alkaline) solutions or dispersions, are similarly protected by the phenyl biguanide, and are therefore comprehended as equivalents.

In many cases the bands are used to close bottles having metal caps, and in order to prevent the formation of rust and consequent staining of the dried band, it has been customary to incorporate a rust inhibiting agent in the solution. Details of this type of rust prevention are disclosed in U. S. A. Patent No. 2,179,571 (Banigan). Such a material may be added to the shipping solutions of this invention.

The present invention is applicable to fields other than the sealing of bottles in which the preservation of regenerated cellulose, and the like, in the wet state is involved.

Regenerated cellulose and related pellicles, especially those in the form of caps and bands for application to bottles as secondary closures, are greatly improved by the impregnation with the biguanides of this invention, since they solve the problem of protection against molds and at the same time contribute to the solution of other problems encountered in handling and storage. They give complete bactericidal and fungicidal protection and greatly improve the protection and stability against rust staining, discoloration of softeners and deterioration of azo printing and dyeing, without altering the chemical and physical properties of the cellulose. Furthermore, they do not cause skin irritation in those handling the impregnated bands. Regenerated cellulose pellicles impregnated with these materials may be subsequently dyed without distortion of colors. They do not embrittle or otherwise damage the cellulosic structures. They are of comparatively low cost. They do not impair the dyes or inks of Federal tax stamps. They are non-odorous. They are sufficiently soluble in water for application from aqueous solution. They are not selectively adsorbed by certain areas of the pellicles (for example, the dyed areas), thus restricting the protection afforded to the structure as a whole.

It is now possible for the manufacturer to pack gel regenerated cellulose pellicles into a container containing a shipping solution, and transport the same to a customer who may use them immediately, or permit them to stand for a considerable length of time without deterioration of the product.

As many apparently widely different embodiments of this invention may be made without departing from the spirit and scope thereof, it is to be understood that this invention is not limited to the specific embodiments thereof except as defined in the appended claims.

I claim:

1. A composition comprising essentially water, 8% glycerol and 0.1% to 1.0% of a phenyl biguanide.

2. A gel regenerated cellulose preservative comprising a phenyl biguanide.

3. A gel band shipping composition containing water, softener and a phenyl biguanide.

4. The process which comprises adding a phenyl biguanide to a gel cellulosic storage solution.

5. A softened, wet, gel regenerated cellulose pellicle, which is capable of shrinkage upon loss of water, containing sufficient of a phenyl biguanide to preclude attack by mold, bacteria and the like.

6. A softened, wet, gel regenerated cellulose pellicle, which is capable of shrinkage upon loss of water, containing sufficient of ortho-tolyl biguanide to preclude attack by mold, bacteria and the like.

7. A dry, regenerated cellulose sheet material comprising 0.3% to 3.0% ortho-tolyl biguanide.

8. A composition comprising essentially water, 8% glycerol and 0.1% to 1.0% of ortho-tolyl biguanide.

9. A gel regenerated cellulose preservative comprising ortho-tolyl biguanide.

10. A gel band shipping composition containing water, softener and ortho-tolyl biguanide.

11. The process which comprises adding ortho-tolyl biguanide to a gel cellulosic storage solution.

12. A dry, regenerated cellulose sheet material comprising 0.3% to 3.0% of a phenyl biguanide.

THOMAS F. BANIGAN.